Jan. 9, 1945.  A. G. DEAN  2,366,709
RAIL CAR UNDERFRAME
Filed Nov. 23, 1943  11 Sheets-Sheet 1
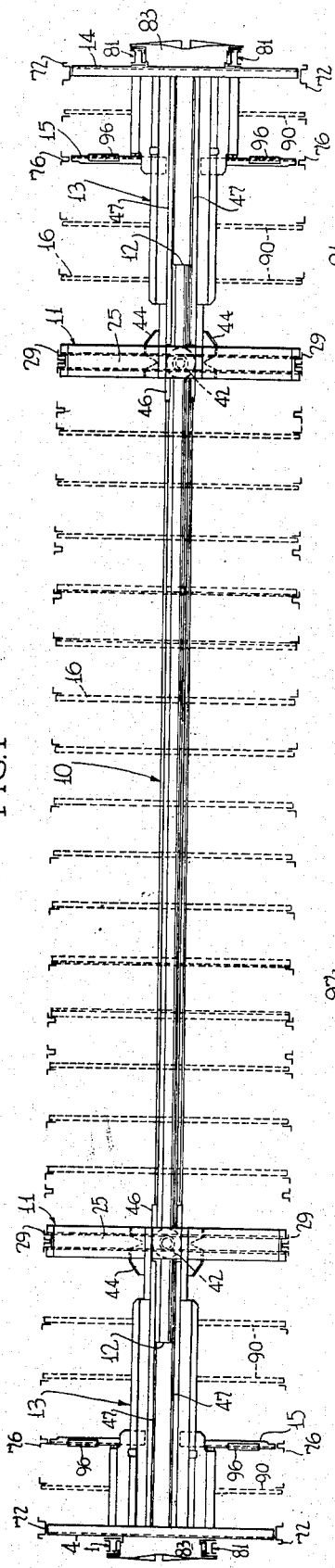
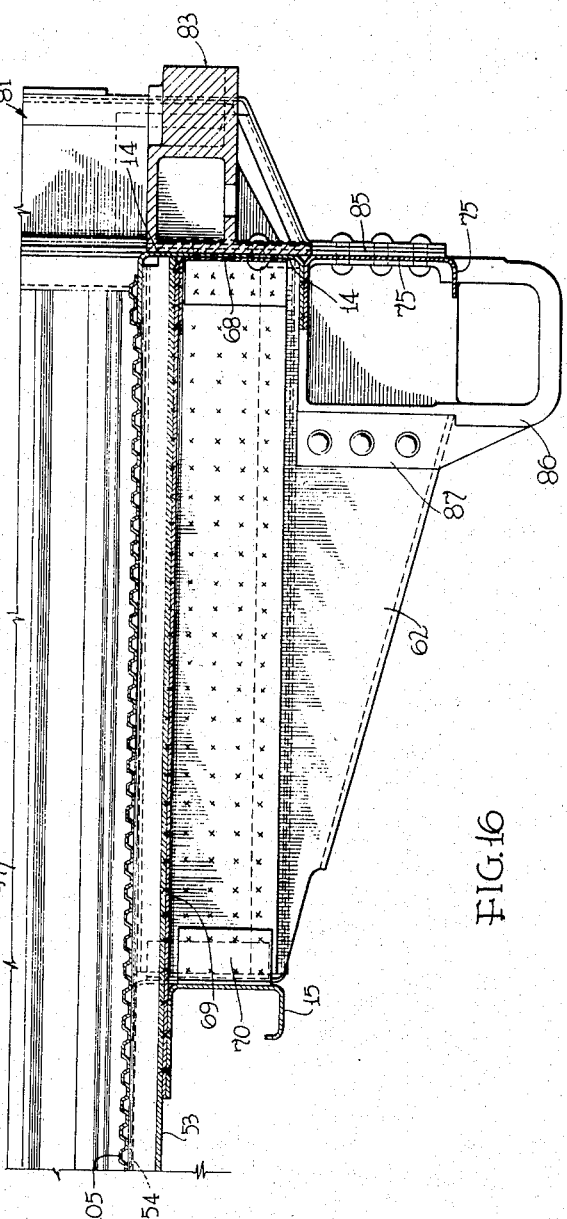
INVENTOR
Albert G. Dean.
BY John P. Tarbox
ATTORNEY Jan. 9, 1945.  A. G. DEAN  2,366,709
RAIL CAR UNDERFRAME
Filed Nov. 23, 1943  11 Sheets-Sheet 2
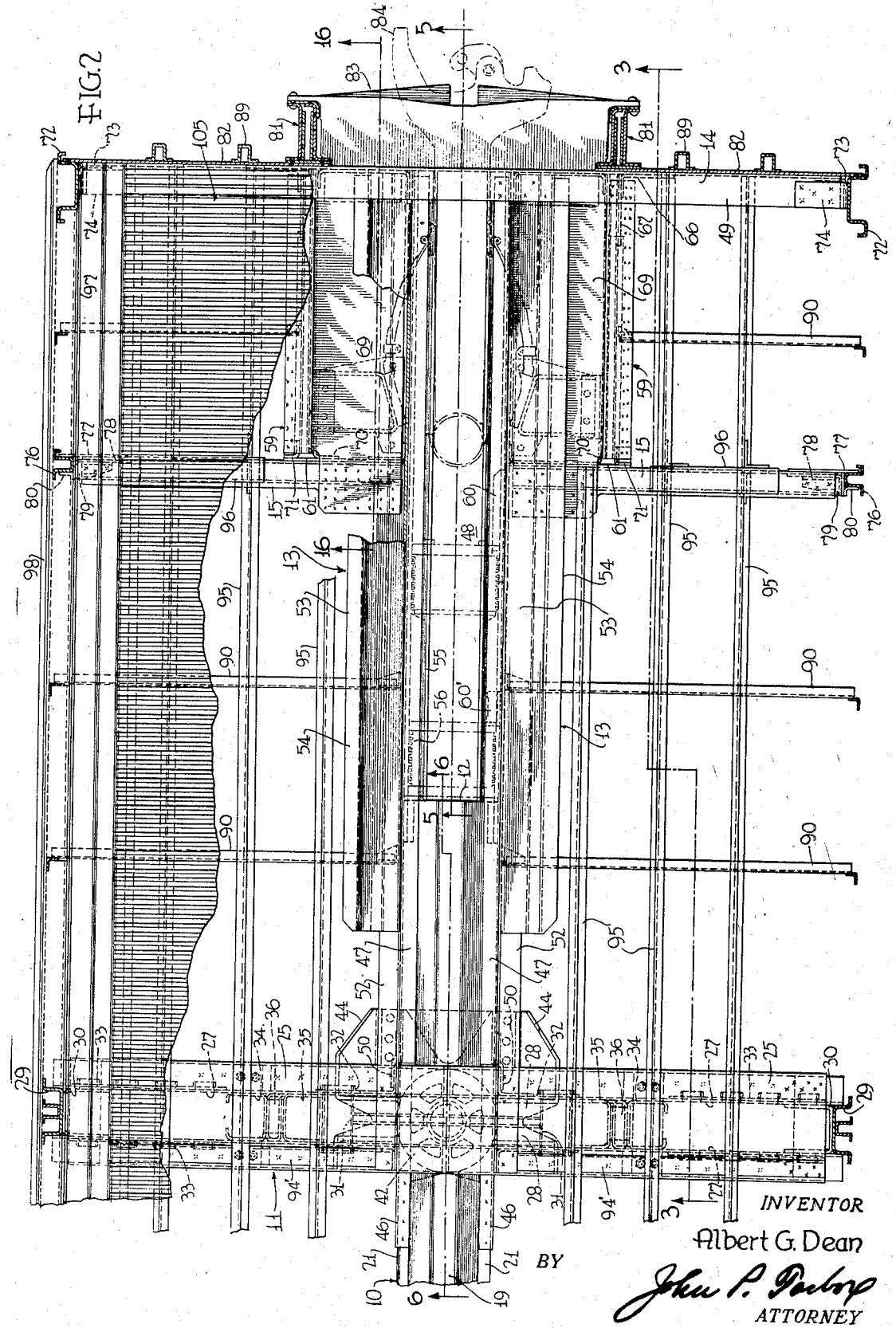
INVENTOR
Albert G. Dean
BY
ATTORNEY Jan. 9, 1945.　　　A. G. DEAN　　　2,366,709
RAIL CAR UNDERFRAME
Filed Nov. 23, 1943　　　11 Sheets-Sheet 3
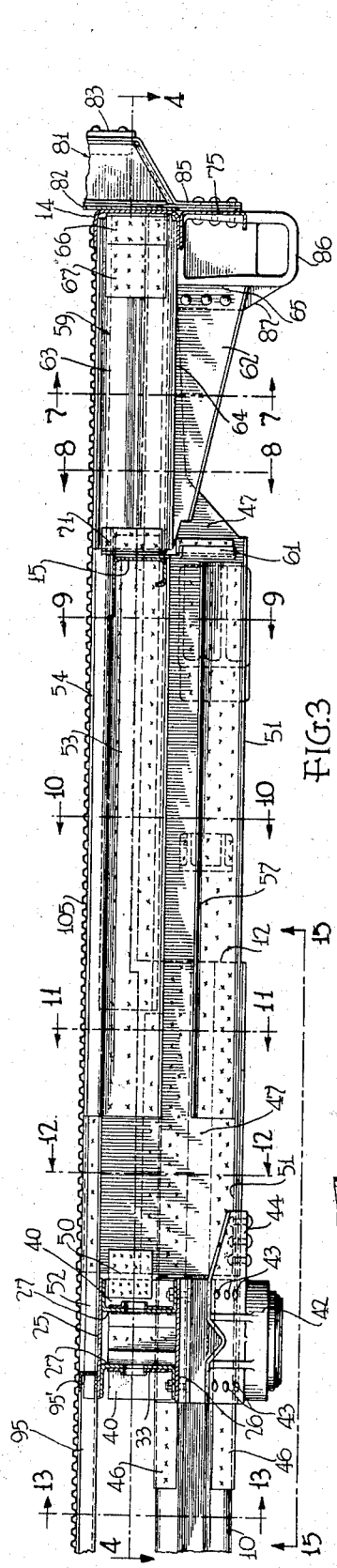
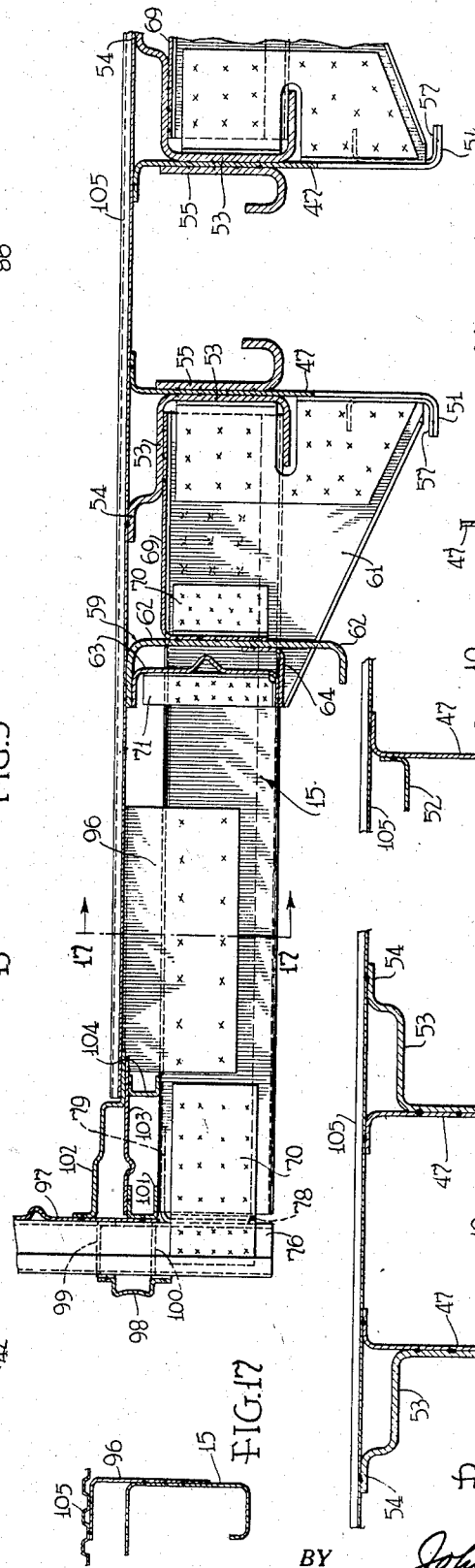
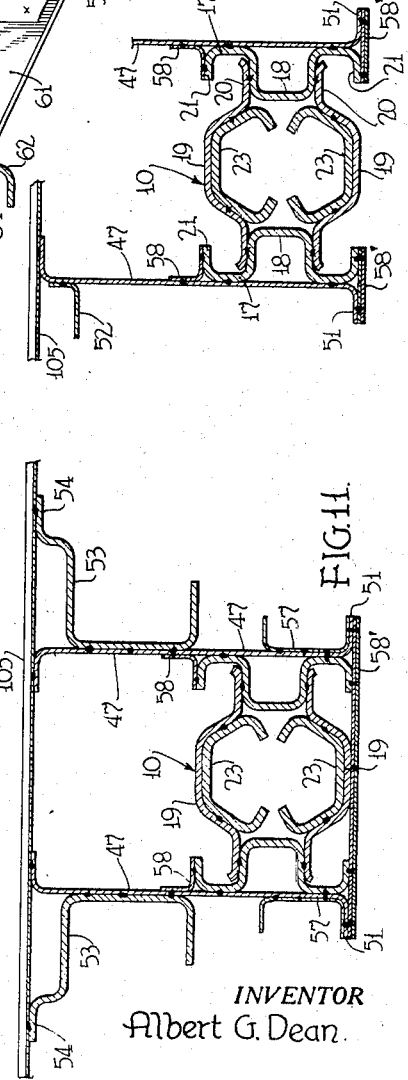
INVENTOR
Albert G. Dean
BY John P. Dashry
ATTORNEY

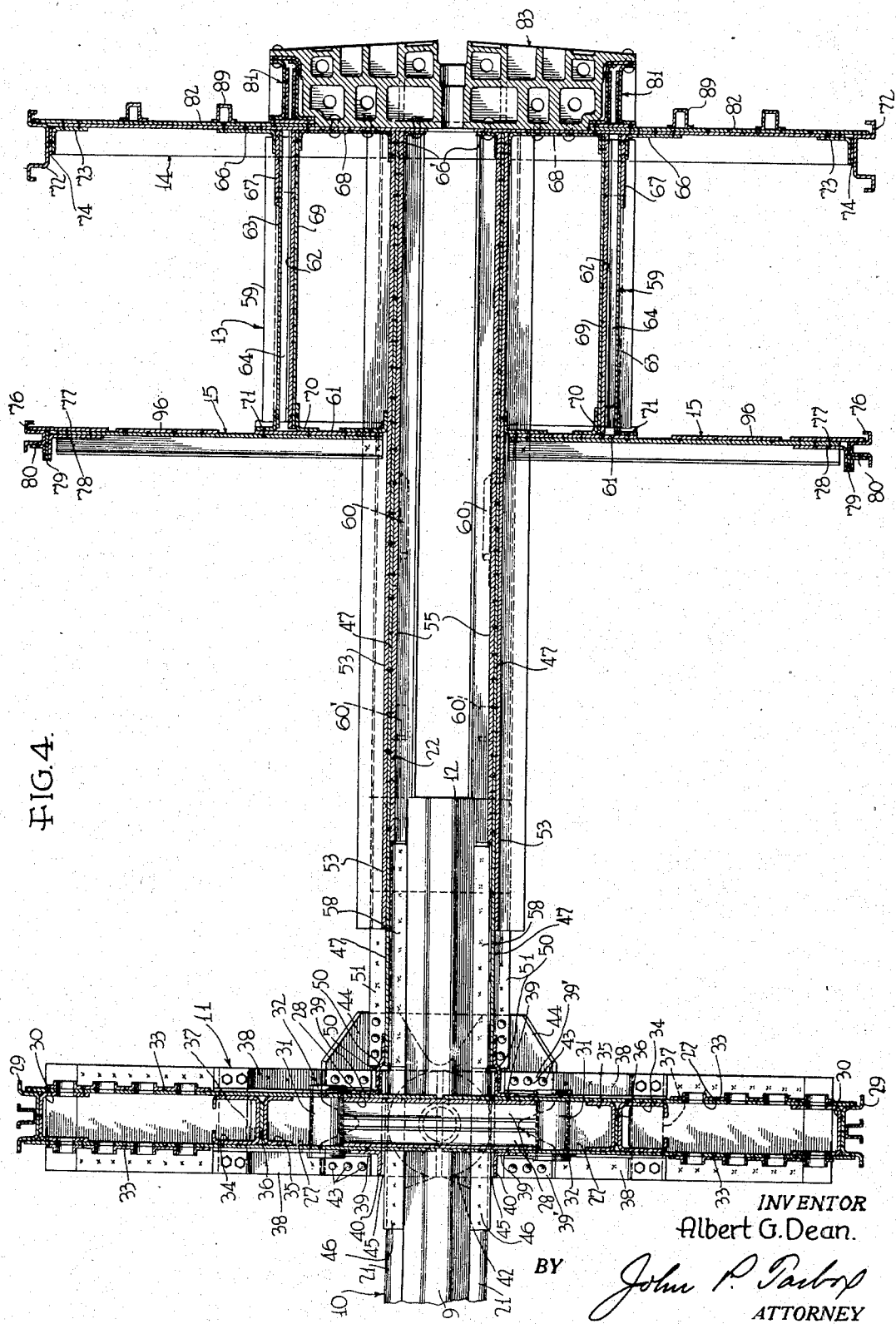

Jan. 9, 1945.  A. G. DEAN  2,366,709
RAIL CAR UNDERFRAME
Filed Nov. 23, 1943  11 Sheets-Sheet 5
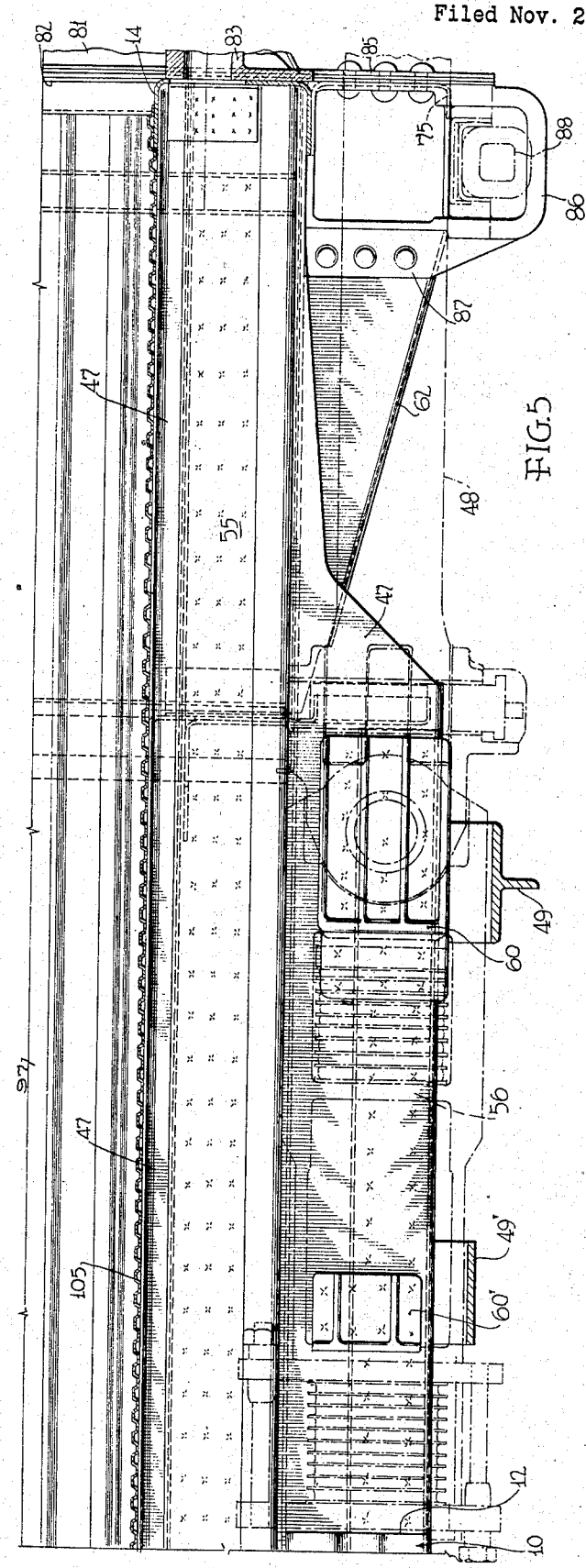
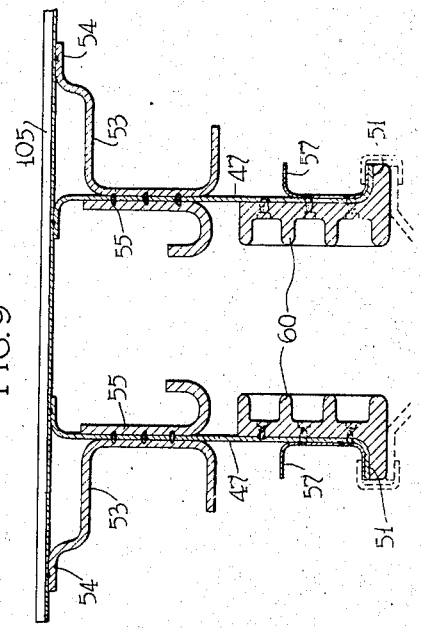
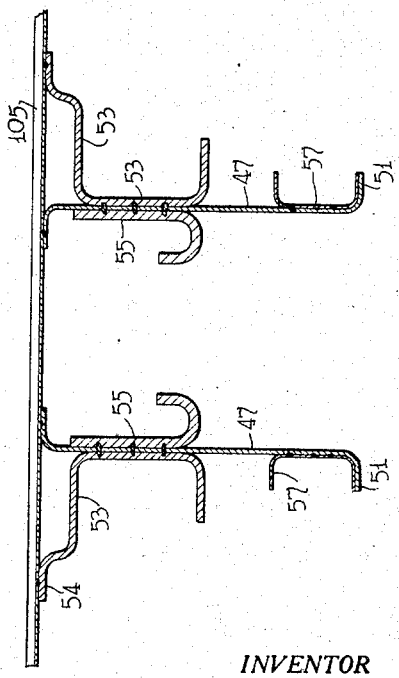
INVENTOR
Albert G. Dean
BY John P. Tarbox
ATTORNEY

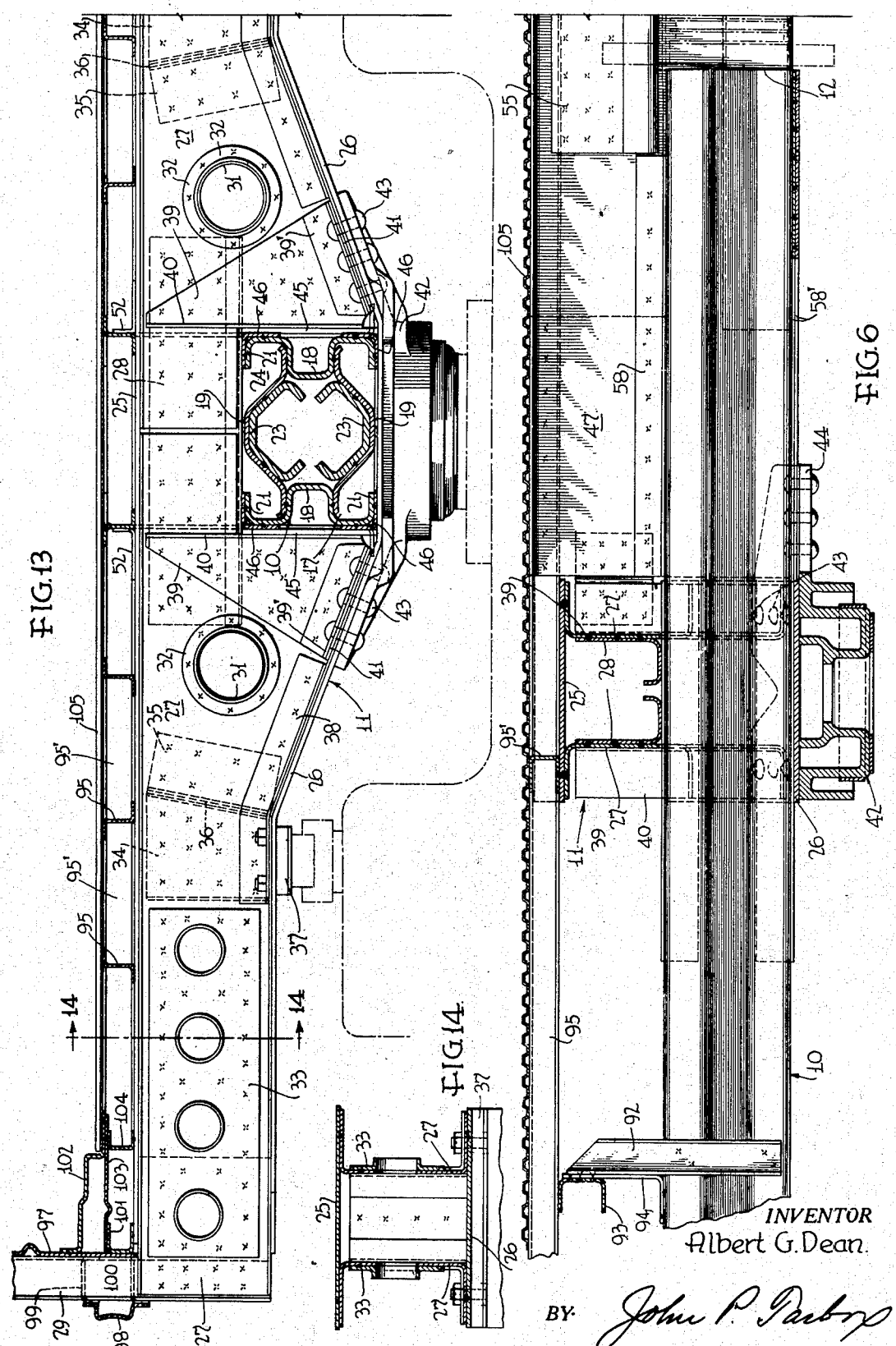

Jan. 9, 1945.    A. G. DEAN    2,366,709
RAIL CAR UNDERFRAME
Filed Nov. 23, 1943    11 Sheets-Sheet 7
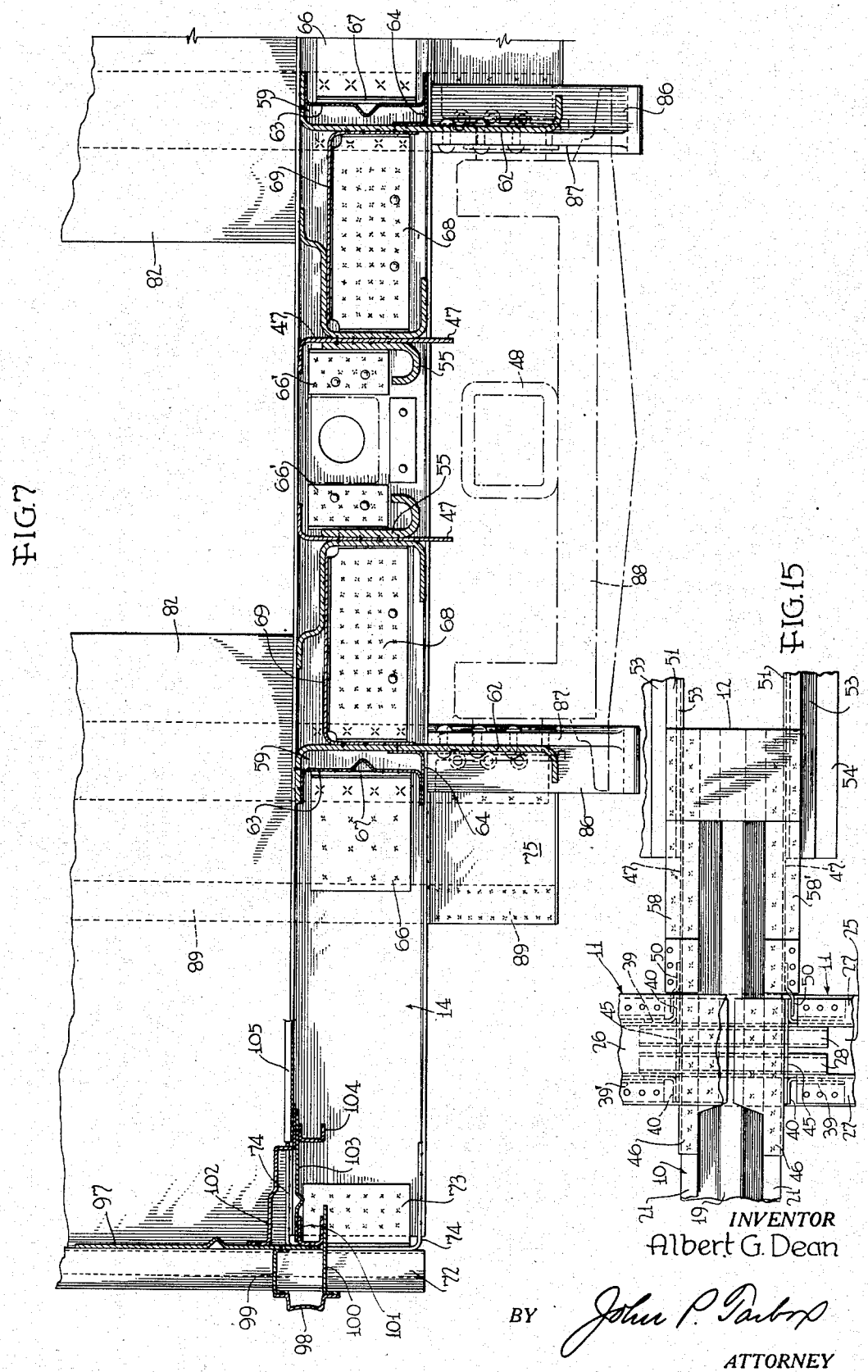

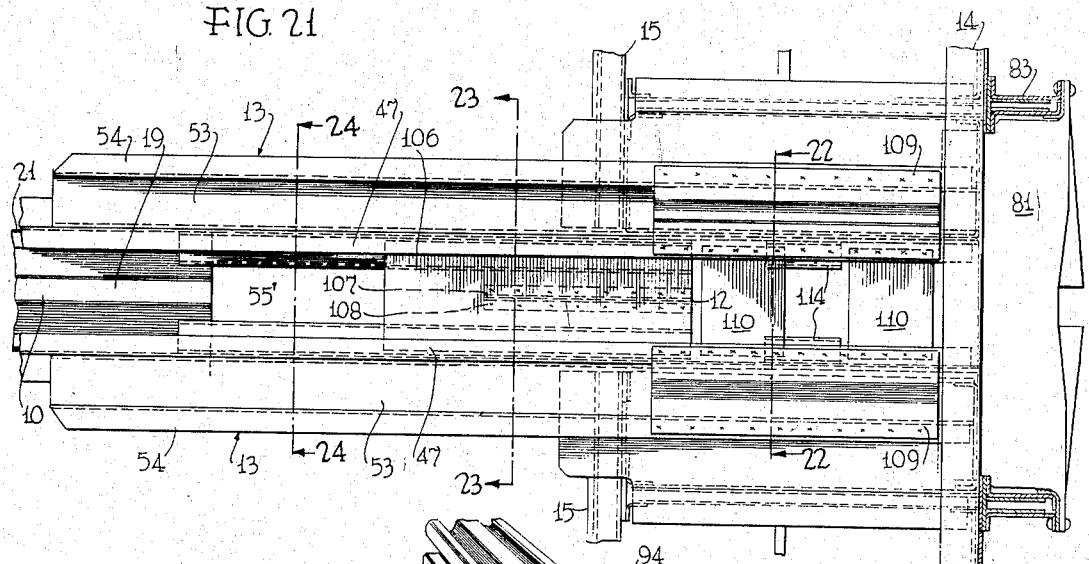
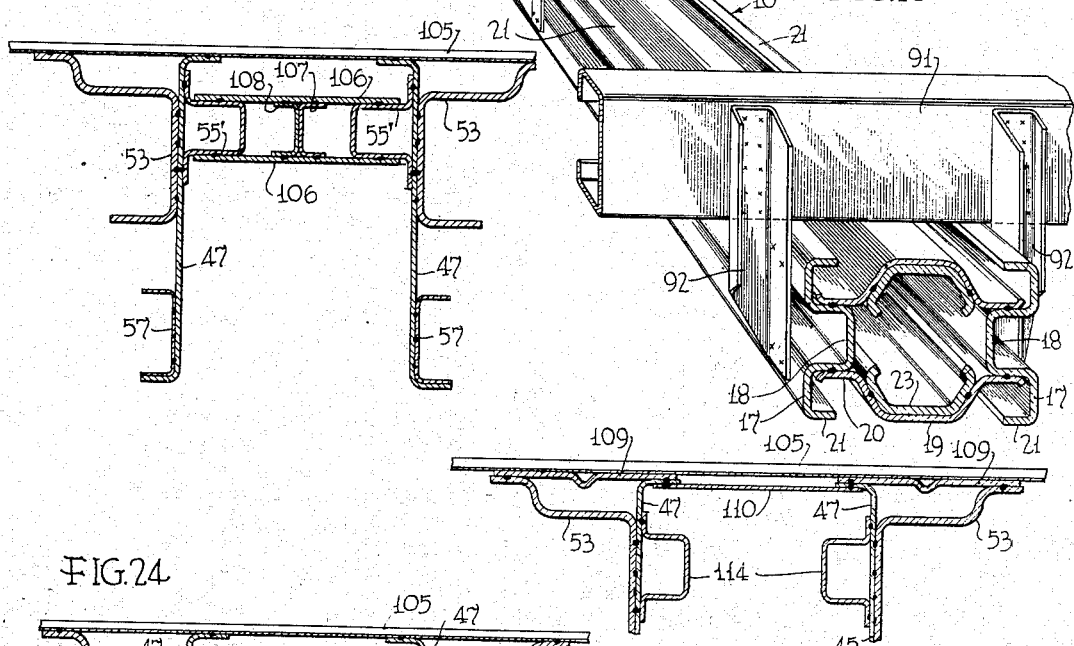

Jan. 9, 1945.  A. G. DEAN  2,366,709
RAIL CAR UNDERFRAME
Filed Nov. 23, 1943  11 Sheets-Sheet 9
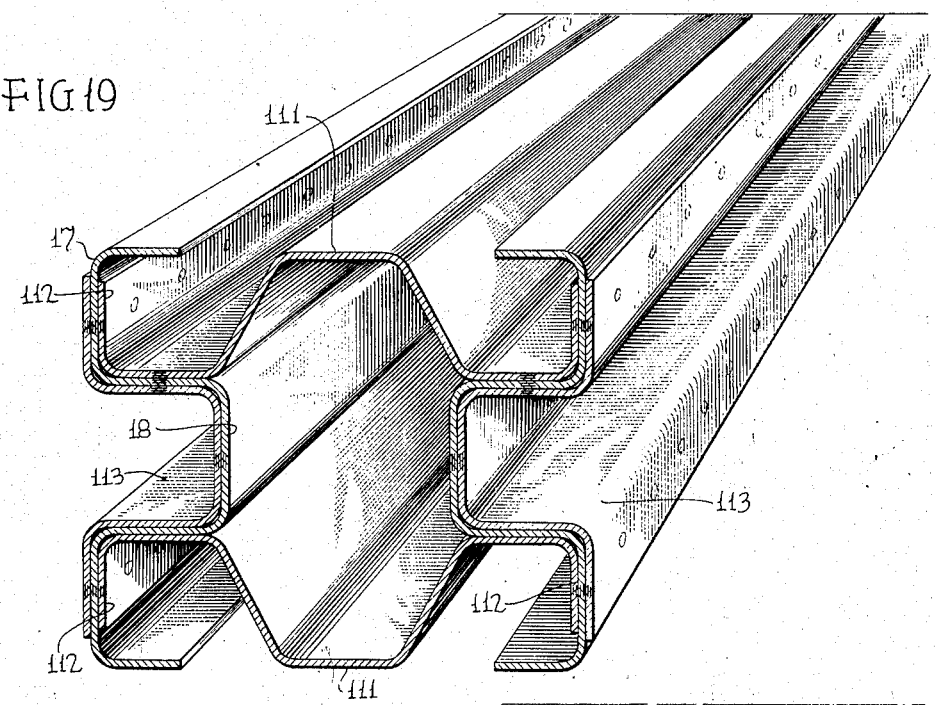
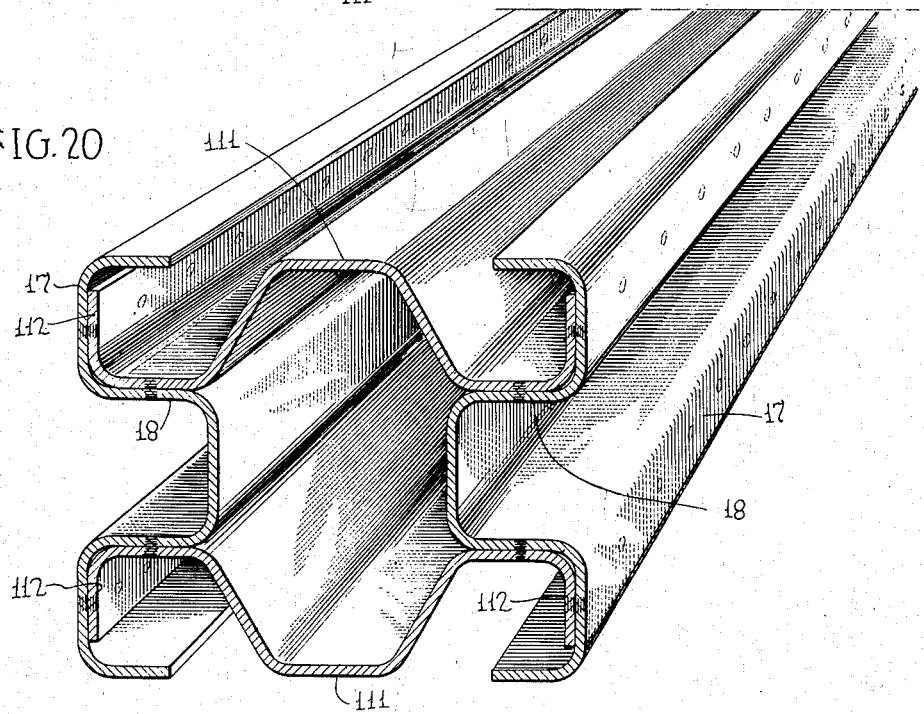
INVENTOR:
Albert G. Dean.
BY
John P. Tarbox
ATTORNEY Jan. 9, 1945. A. G. DEAN 2,366,709
RAIL CAR UNDERFRAME
Filed Nov. 23, 1943 11 Sheets-Sheet 10
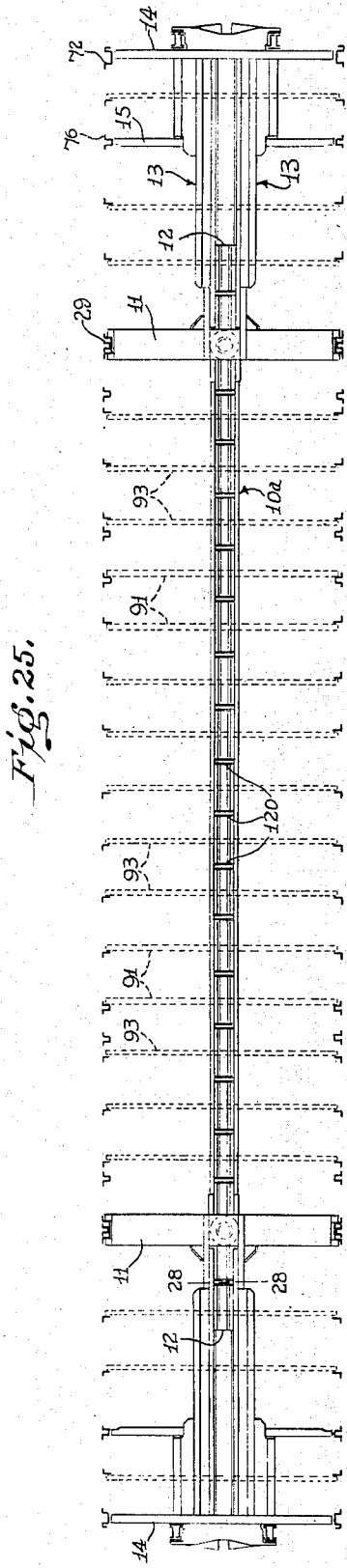
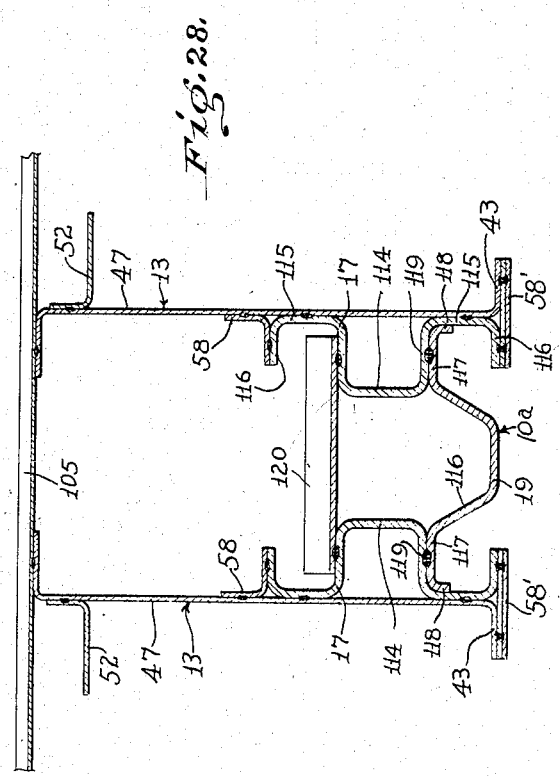
INVENTOR
Albert G. Dean
BY John P. Bailey
ATTORNEY Jan. 9, 1945.  A. G. DEAN  2,366,709
RAIL CAR UNDERFRAME
Filed Nov. 23, 1943  11 Sheets-Sheet 11
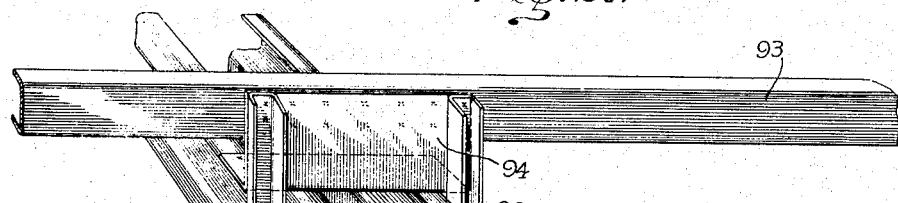
Fig. 26.
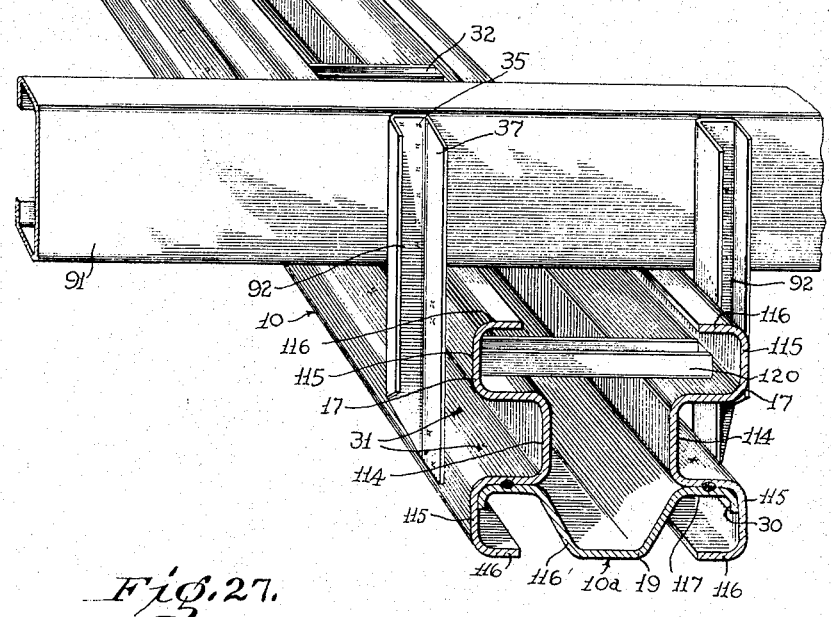
Fig. 27.
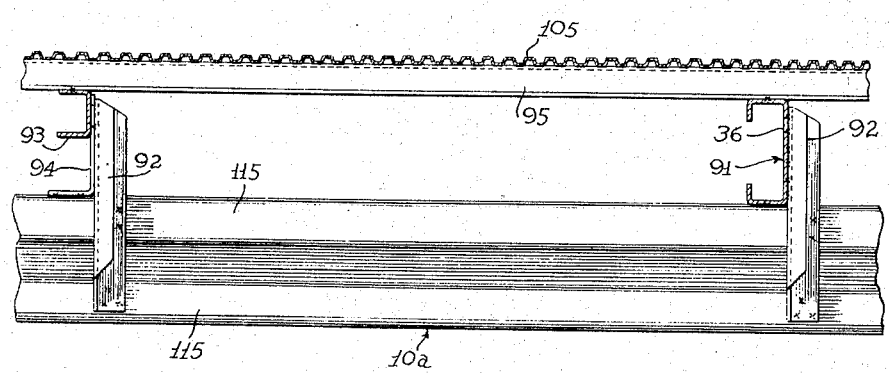
INVENTOR
Albert G. Dean
BY John P. Pasbrp
ATTORNEY Patented Jan. 9, 1945

2,366,709

UNITED STATES PATENT OFFICE 2,366,709

RAIL CAR UNDERFRAME

Albert G. Dean, Narberth, Pa., assignor to Edward G. Budd Manufacturing Company, Philadelphia, Pa., a corporation of Pennsylvania Application November 23, 1943, Serial No. 511,443

29 Claims. (Cl. 105—418)

The invention relates to rail car underframes and particularly to the center sill of such underframes and associated structures. This application is a continuation-in-part of application S. N. 296,026 filed September 22, 1939 for "Rail car underframe" and a continuation-in-part of application S. N. 445,158 filed May 30, 1942, for "Center sill construction."

It is a main object of the invention to provide an underframe of the class which, for standard size railway cars, is of light weight as compared with known such underframes and yet one which acts to absorb the heavy draft and buffing loads as well as to take the extremely heavy collision shocks incident to railway car operation and which meets with A. A. R. requirements to substantially the same or even greater degree as previous heavy type underframes.

It is a further object of the invention to provide an underframe which can be readily assembled in subassemblies by spot welding, which subassemblies are as readily joined together in final assembly and to adjoining side and end wall structures of the body, the latter also preferably of light-weight construction. To the end of achieving these objects, substantially the entire underframe, including bolsters, transverse floor beams, longitudinal stringers, center and side sills and flooring, as well as the end sills and the buff and draft gear housing center sill extensions connecting the end sills to the bolster and center sill proper are constructed, in the main, of light-gauge members which may be rolled or drawn sections of strip stock and which are so formed in their margins as to facilitate joinder to each other and into the body structure as a whole, as by spot welding.

To this end also, the center sill end extensions of the underframe connecting the end sill to the bolster, the bolster and the center sill proper may all be assembled as separate subassemblies, the parts of which are so formed as to be readily so subassembled and joined together in final assembly.

The center sill proper is of relatively small dimensions in cross-section and is constructed of a plurality of longitudinally formed strips, preferably deeply ribbed or channeled longitudinally, which are formed to overlap and be spot welded together to form a rectangular box-section structure, this box-section having non-projecting flanges allowing subsequent attachments to all four faces. Similarly, the bolster is preferably a box-section structure fabricated of sheet metal members of appropriate cross-section and reinforced in appropriate regions.

To further facilitate assembly and to strengthen and stiffen the underframe, certain of the elements of the underframe, such as the side sills, may form parts of the side wall subassemblies, which are preferably truss structures, the side sill forming the lower chord of the truss. This side sill structure is a composite of box-section structures vertically and transversely deep and when joined to the underframe structure, is well adapted to aid the latter in absorbing lateral collision shocks. The end wall structure also enters into the underframe structure by having the longitudinally deep collision posts extended down beyond the end sill and there tied into the collision-taking structure, these collision posts and their tie-in into the end underframe structure providing a very effective anti-telescoping structure.

Another object of the invention is the provision of an underframe in which the buffing strains from the coupler are capable of direct transmission to the unitary center sill proper terminating some distance beyond the bolster, and not indirectly as usual, through abutments on laterally spaced buffer sills which are in turn secured to the sides of the center sill.

To this end, the center sill is arranged substantially in line with the buffing mechanism and coupler, and the entire end area of the sill is arranged to receive the thrust of the buffing forces.

Another object of the invention is the provision of a construction in which the buffing, draft and collision forces are directly transmitted to longitudinal members of the underframe without providing large gussets and so as to minimize fatigue stresses in the joints to a maximum. To this end, the buffing forces are not only directly transmitted to the center sill over its end area by the buffer mechanism arranged in line with the center sill, but the longitudinal members flanking the buffing mechanism which are strongly tied into the center sill to transmit collision forces thereto are made to directly abut the end sill, against the outside face of which the collision posts of the end structure abut. Finally, a buffer beam casting extending between the spaced collision posts and abutting and secured to the outer faces of the posts and the end sill interposed between the longitudinal members of the underframe insures that the collision shocks are transmitted directly to the longitudinal members of the undeframe and by reason of their direct connection to the flooring are distributed throughout the entire width of the underframe.

Other and further objects and advantages will become apparent from the following detailed description when read in connection with the accompanying drawings forming a part hereof.

In the drawings,

Fig. 1 is a more or less diagrammatic view in plan of the underframe, the main longitudinal and transverse members being shown in full lines, other transverse members being shown in dotted lines, and the vertical members of the side and end walls of the body being shown in section, the section being taken immediately above the underframe. In this view the longitudinal stringers and floor plating and other detail of the underframe have been omitted.

Fig. 2 is a similar sectional view of the right-hand end of the underframe on an enlarged scale, this view showing the parts more in detail including the longitudinal stringers and a portion of the floor sheeting, the remainder of the floor sheeting being broken away;

Fig. 3 is a vertical longitudinal sectional view, the section being taken substantially along the line 3—3 of Fig. 2;

Fig. 4 is a sectional plan view of the end of the underframe, the section being taken substantially along the line 4—4 of Fig. 3;

Fig. 5 is an enlarged vertical sectional view taken substantially along the line 5—5 of Fig. 2;

Fig. 6 is a fragmentary sectional view on the same scale as Fig. 5, this section being an extension of the section shown in Fig. 5 taken substantially along the line 6—6 of Fig. 2;

Figs. 7, 8, 9, 10, 11, 12 and 13 are fragmentary enlarged sectional views through a portion of the underframe, these sections being taken substantially on the lines 7—7, 8—8, 9—9, 10—10, 11—11, 12—12 and 13—13, respectively, of Fig. 3;

Fig. 14 is a detailed sectional view through the bolster, the section being taken along the line 14—14 of Fig. 13;

Fig. 15 is a fragmentary view of a portion of the underframe as seen along the line 15—15 of Fig. 3, the parts being shown with the center bearing casting of the bolster removed;

Fig. 16 is an enlarged fragmentary vertical longitudinal sectional view, the section being taken along the line 16—16 of Fig. 2;

Fig. 17 is a detailed sectional view taken substantially on the line 17—17 of Fig. 8;

Fig. 18 is a fragmentary perspective view of a portion of the center sill with portions of several of the floor beams connected thereto showing typical connections between the center sill and floor beams;

Figs. 19 and 20 are enlarged fragmentary perspective views of two modified forms of center sills adapted for use in either of the forms of underframe shown in the preceding views;

Fig. 21 is a plan view of a fragmentary portion of a modified form of end underframe, the view corresponding to Fig. 2;

Figs. 22, 23 and 24 are fragmentary sectional views taken, respectively, on the lines 22—22, 23—23 and 24—24 of Fig. 21, these views showing the floor plating in place;

Fig. 25 is a diagrammatic plan view of an underframe showing a further modified form of center sill construction applied thereto;

Fig. 26 is a fragmentary perspective view on an enlarged scale of a portion of the center sill showing typical connections of the floor beams of the underframe thereto;

Fig. 27 is a fragmentary vertical longitudinal section through the portion of the underframe of Fig. 2 showing the sill in side elevation and showing the floor stringers and floor resting on the floor beams; and Fig. 28 is an enlarged fragmentary sectional view through the joint of the center sill proper and the end extension thereof, the section being taken approximately on the line 28—28 of Fig. 25.

The sectional views appear as if viewed in the direction of the arrows at the ends of the section lines.

Referring to the drawings, Fig. 1, it will be seen that the main longitudinal member of the underframe comprises a center sill which includes three main portions, a central portion designated generally by the numeral 10 and extending between, through and beyond the bolsters 11 and terminating at each end in vertically disposed plane end surfaces as 12 located some distance beyond the bolsters, and two transversely widened and stepped end portions 13 connecting the ends of the central portion 10 to the end sills 14. A secondary end sill 15 connects this widened extension 13 intermediate its ends to the side walls of the body. The positions of additional transverse members or floor beams are indicated in dotted lines in Fig. 1.

For convenience of assembly, the end sills 14 may form a part of an end wall subassembly but the remaining parts hereinbefore described are preferably assembled on a jig as a separate underframe subassembly.

The central center sill portion 10 will hereafter, for convenience of description, be referred to as the center sill proper and the end portions 13 will be referred to as the end extensions of the center sill proper or as the main longitudinal members of the end underframe. The end underframe will be understood as that portion of the underframe from a bolster to the adjacent end of the underframe and including the bolster.

The center sill proper 10 comprises a novel rectangular box structure of compact cross-section. As shown clearly in Figs. 11, 12 and 13, it is built up of drawn or rolled sheet metal strips of generally angular cross-section. The two lateral strips or members 17 are of identical form and of generally inwardly facing channel cross-section having a deep central rectangular channel-section rib 18 and edge flanges formed by the side walls of the main bodies of said strips or members 17. The top and bottom members 19 are also of substantially identical cross-section and comprise inwardly facing channels which may have edge flanges 20 slightly turned up or flanged in their margins for better gauging during fabrication. These edge flanges 20 overlap the side walls of the deep channel ribs 18 of the lateral sections and are strongly secured thereto throughout their length by numerous closely spaced spot welds. As shown in these figures, the bottom walls of the channels of the strips 19 are wider than the bottom walls of the channels 18 of the lateral members 17 and are substantially in the plane of the side walls 21 of the channel members 17 and the side walls of the channels of said strips 19 are inclined. So formed, the strips 19 can be made on the same draw rolling machine as the lateral strips 17 by merely omitting the final forming rolls used in forming the latter. The over-all section of the center sill proper 10 is of relatively small dimensions although by reason of the angularity of the parts entering into the section and the gauge of the metal used, say ⅛ to 3/16 inch, the area of the metal of the section is quite large, say 12 to 18 square inches, in the completed sill structure. It will be seen, therefore, that a center sill so constructed has very great columnar strength and yet is of exceedingly light weight. By reason of its small dimensions, it takes up very little space, and can be arranged in a low horizontal position directly in line with the buffer mechanism and coupler. As previously stated, the ends of the sill are formed with plane vertical faces 12 at right angles to the buffer mechanism and coupler so that the buffing force from the coupler mechanism is transmitted directly to the entire cross-section of the column.

To increase the cross-sectional area of the metal for greater strength without increasing the outside dimensions of the sill, reinforcing members 23 may be employed. These reinforcing members are, in the present instance, of channel cross-section with inwardly-turned edge flanges, the channels nesting with the channels of the top and bottom members 19 and being secured thereto by spot welding. These reinforcing members 23 may extend the full length of the sill proper 10 or they may extend inwardly from the ends of the sill and terminate some distance from said ends. These reinforcements being of the same or heavier gauge than the members 17 and 19 materially increase the columnar strength of the sill.

The sill so constructed provides numerous flanges forming flat faces on all four sides thereof which are open and accessible for the securement of other members of the underframe structure to the sill. Such members include the bolsters 11, the end sill extensions 13 and the transverse floor beams, etc.

The bolsters 11, like the center sill proper, are assembled as separate subassembly units and are preferably of box cross-section. Their top faces are flat and their bottom faces are extended parallel to their top faces for some distance inwardly from their ends from which point they are inclined downwardly toward the center and provided with a flat portion at the center of somewhat greater width than the width of the center sill (see Fig. 13). In the lower portion of this central deepened portion of the bolsters, they are provided with a rectangular opening 24 to receive the center sill.

The detailed construction of each bolster is most clearly shown in Figs. 3, 4, 6, 13, 14 and 15. The main members comprise a flat top plate 25, a flat bottom plate 26 and lateral channel-section plates 27, these latter being of laterally facing channel cross-section with their side walls overlapping the top and bottom plates and secured thereto by spot welding. There are four such side plates to each bolster and in their central portion they terminate in their lower portions at the sides of center sill receiving opening 24, but at their upper portions they are extended inwardly over the center sill opening to have the edges of these upper portions of the two plates on each side terminate in close proximity adjacent the center of the bolster (see Fig. 13). These extended upper portions of the side plates are strongly joined together in each case by a substantially J-section plate 28 overlapping their inside faces by a wide overlap and secured thereto by numerous spot welds. As shown in Figs. 6 and 13, the bottoms of these J-members terminate at the top of the opening 24 which receives the center sill.

The outer ends of the side plates 27 are extended beyond the top and bottom plates to overlap the side walls of the channel-section posts as 29 of the side wall trusses to which they are secured in final assembly by numerous spot welds (see Fig. 13).

Additional reinforcement and provision for securement to the side wall posts is provided by a channel member 30 telescoped between the side plates 27 and having its bottom wall in position to overlap the bottom wall of the post, this channel being in final assembly spot welded to the bottom wall of the post and to the side plates 27 in the subassembly.

The bolster is provided with a number of openings extending through its side walls for the passage of pipes, wires, cables, and/or other equipment, four such openings being arranged near each end of the bolster and one adjacent each end of a central reinforcing plate 28. These latter two are of larger size than the end openings and the side walls of the bolster are tied together in the region of these openings by tubes 31 extending some distance beyond the side plates 27 and secured thereto through angular sectioned rings 32, these rings being spot welded through one of their arms to the plates 27 and through the other to the tubes 31.

In the region of the lateral openings, the plates 27 are strengthened by reinforcing plates 33 spot welded thereto and provided with flanged openings aligned with the openings extending through the plates 27.

It is desirable to further reinforce the bolster against buckling in the region where the horizontal side portion of its bottom wall merges with the downwardly inclined bottom of the central portion. To this end, there is provided at this point a strong inner reinforcement which may consist of two channels 34 and 35 welded to an intermediate flat strip 36 which directly abuts the bottom wall of the bolster at this point. The side walls of the channels are strongly secured by numerous spot welds to the side plates 27.

Since the side bearings 37 are secured adjacent this point by bolting them to the laterally extending flanges formed by the bottom plate 26 and the side plates 27, these flanges are further reinforced in this region by angle members 38 spot welded through one of their flanges to the adjacent side plates and through the other of their flanges to the adjacent laterally extending flange through which the bolts extend.

At each side of the opening 24 receiving the center sill, the bolster is further reinforced by triangular shaped gussets 39 of substantially the height of this central portion of the bolster. These gussets have vertical flanges 40 paralleling the opening and bottom flanges 41 overlapping the lower lateral flanges of the plates 27 and are strongly secured to the side plates 27 in their bodies by numerous spot welds (see Fig. 13). In the angle of their lower margins, the side plates 27 are further reinforced by an angle 39' nesting with the angle formed by the body of each gusset and its bottom flange 41. In these regions of quadruple thickness, sheet metal is secured to the center bearing casting 42 of the bolster, as by riveting as shown at 43, through the four thicknesses of sheet metal and an overlapping portion of the casting. The casting has extensions 44 at opposite sides thereof (see Fig. 4), in position to overlap the inner end of the end extension 13 of the center sill in a manner which will be subsequently described.

At the sides of the opening 24, the bolster is further reinforced by vertical plates 45 overlapping the vertical flanges 40 of the gussets 39 and secured thereto. To these plates 45 are further secured, at the four corners of the opening, the angles 46 spot welded thereto through their vertical arms. These angles 46 preferably extend some distance beyond the inward side of the bolster and form final assembly joints for securing the center sill proper to the bolster. When the bolster is telescoped over the center sill in the assembly, the angular corners of the sill overlap or nest with the angles 46 and are secured thereto through the overlaps by spot welding as is clearly shown in Figs. 4 and 13.

From the foregoing description, it can be seen that the bolster is very strongly reinforced around the center sill opening therein to compensate for the weakening produced by provision of this opening and the center sill can readily be passed through this opening in the assembly of the underframe and secured to the bolster as already described. It is also seen that the bolster except for the center plate casting is fabricated entirely of sheet metal members of relatively light-gauge material so that an exceedingly light yet strong bolster structure results.

Referring now to Figs. 1, 2, 3, 4, 6, 7, 8, 9, 10, 11 and 12, it will be seen that the center sill end extensions indicated generally by the reference numeral 13 in Fig. 1, is a structure arranged symmetrically on opposite sides of the vertical central plane of the car and this structure, together with the secondary end sills 15, may conveniently be assembled as a subassembly which is subsequently assembled to the center sill proper 10 and the bolster in the assembly of the underframe. The main longitudinal members of this subassembly comprise vertically deep members 47 of Z-section throughout the greater portion of their length and, in this portion, extending in height from the flooring to the bottom of the sill proper 10. At the front, the lower portions of members 47, as clearly appears from Figs. 3 and 5, are cut away to make room for the swinging of the coupler arm 48. These main longitudinal members extend from the bolster to the end sill 14, which is of inwardly facing channel-section, and have the vertical webs thereof abut the bottom of this channel-section end sill. At their inner ends, they have a long overlap with the sides of the center sill proper 10 and are secured thereto through their long overlap therewith by numerous spot welds (see Figs. 3, 11 and 12). These members 47, in themselves, because of their vertical depth and their angular construction, form strong column members to transmit buffing or collision shocks from the end sill to the center sill proper and the bolster. They are secured to the bolster at the top, in the final assembly, by plates 50 (see Figs. 3 and 4) which overlap the inner ends of these members and the outwardly extending vertical flanges of the gussets 39 and are secured to these parts by spot welding. At the bottom, their laterally extending flanges 51 (see Fig. 4) overlap the extensions 44 of the center bearing casting and are secured thereto as by riveting. At the extreme top, these members are further connected to the bolster by angles 52, Figs. 3, 12 and 13, which have one arm welded to the vertical webs of the members and the other arm extended horizontally and overlying the top of the bolster in the final assembly, to the flanges of which they are secured by spot welding.

The deep vertical webs of these main members 47 are strongly reinforced from a point forwardly of the bolster but a substantial distance rearwardly of the outer end of the center sill proper by laterally facing channels 53 which have their upper side walls extended by Z-section portions 54, the marginal flanges of which lie in the plane of the top flange of the members 47. These members are strongly secured through their bottom walls by spot welding to the webs of the members 47 (see Figs. 3, 7, 8, 9 and 10). As shown in Figs. 9 and 10 and in the section of Fig. 4 as well as in the plan view of Fig. 2, the reinforcing channels 53 and the members 47 are further reinforced on their inner sides by substantially J-section members 55 extending from a distance slightly inward of the end of the center sill proper 10 to the end sill 14.

As shown in Figs. 4, 9 and 10, these three members 47, 53 and 55 are strongly welded together by numerous closely spaced spot welds so that they form in effect a strong columnar structure for transmitting thrust directly from the end sill to the center sill and bolster.

Between the end of the center sill proper 10 and the end of the vertically deep portions of the members 47, the spaced members 47 provide a pocket for receiving the buff and draft cushioning gear designated generally by the numeral 56 and shown in dot-and-dash lines in Fig. 5. To stiffen the side walls of this pocket, the lower margins of the members 47 are further reinforced by outwardly facing channels 57 extending throughout this region and nesting with the angles formed by the vertical webs of the members and their bottom flanges. These channels are securely spot welded to the members 47 and their inner portions overlap the outer end of the center sill proper and are further secured thereto by spot welds. In this region, to maintain the buff and draft cushioning gear in place after insertion from the bottom, and to strongly tie the two spaced members 47 together, transverse tie members 49 and 49', indicated in Fig. 5, are provided. Abutments 60 and 60' for the cushioning gear (see Figs. 5 and 9) are welded to inside faces of the lower portion of members and strongly reinforce them in these regions. It will be seen by reference to Fig. 5 that the transverse tie members 49 and 49' are provided in the region of these abutments, where the tendency to spread is greatest.

From the foregoing it will be seen that these composite columnar structures formed by the members 47, 53, 55 and 57 provide a very strong end extension of the column of the center sill proper to direct abutting relation with the end sill 14. As shown in Fig. 4, the members 47, 53 and 55 each abut against the bottom of the end sill and thrusts transmitted to the end sill are through them transmitted directly to the center sill proper.

Connection is further made between the center sill proper 10 and the members 47 by angles 58 welded to the webs of the members 47 and the top flanges of the center sill, respectively. These angles, as shown in Figs. 3, 4, 11 and 12, extend from the inner end of the J-members 55 to the bolster. This connection is further strengthened by double thickness plates 58' extending across the lateral bottom flanges 21 of the sill and the bottom flanges 51 of the members 47 and welded thereto. It is through this multiple thickness metal that the rivets connecting the flanges 51 to the center bearing casting 42 are passed.

The composite columns 47, 53 and 55 are laterally extended in stepped fashion adjacent the outer ends by auxiliary longitudinal columns designated generally by the numeral 59 extending from the end sill 14 to the secondary end sill 15.

The secondary end sill 15, as shown in Fig. 4, is in two sections each extending laterally from one of the main longitudinal members 47 to the adjacent side wall. As shown in Figs. 8 and 17, the secondary end sill 15 is a channel-section member, its lower side wall being marginally flanged. The inner end of the sill 15 is strongly secured to the adjacent composite longitudinal members 47, 53, 55 by having its top side wall welded to the top side wall of the adjacent channel member 53 and its bottom side wall welded to the bottom side wall of said member. To secure a wide overlap to permit strong joinder between the top side wall of sill 15 and the member 53, as shown in Fig. 2, the top side wall is inwardly widened adjacent its inner end. This inner end is additionally secured to the composite longitudinal members 47, 55 and 53 by a flanged gusset 61, Fig. 8, which overlaps in its body portion the bottom of the channel of the secondary end sill 15 and is secured thereto by spot welding and through its flanges it overlaps the bottom of the channel 53 and the lower portion of the web of member 47 and is welded thereto. This gusset, for convenience of manufacture, may be in two parts spot welded together as clearly appears in Figs. 4 and 8 and it is cut away to receive the lower side flange of the member 53.

The auxiliary longitudinal columns 59 each comprise a main longitudinal member 62 of laterally facing channel section which increases in depth outwardly so that its outer end extends a substantial distance below the end sill 14. The top side wall of this member 62 is in the same plane as the tops of members 47 and 53. This main member 62 forms with an additional channel 63 and an angle 64 welded together and to the top flange and web of said main member a box-section structure. The composite column structure so formed by the members 62, 63 and 64, as clearly shown in Fig. 4, abuts the bottom wall of the end sill 14 at its forward end, the main member 62 being cut away in its lower portion below the top face of the lower side wall of the end sill and terminating in this region in a vertical edge 65 (see Fig. 3). The auxiliary columns 59 are each strongly connected to the end sill 14 by an angle 66 welded, respectively, to the end sill and to the double thickness metal formed by the bottom of the channel 63 and a reinforcing plate 67 welded to the outer end thereof and also abutting the end sill. This auxiliary column 59 is additionally connected to the end sill and to the main longitudinal columns 47, 53, 55 by a channel 68, the bottom wall of which is welded to the end sill and the side walls of which are welded, respectively, to the main member 62 of the column 59. Additional angles 66' connect the inner faces of the main columns 47, 53, 55 to the end sill.

The main columnar structure 47, 53 and 55 and the auxiliary column 59 are further strongly interconnected throughout the entire length of the column 59 by an angle plate 69 welded through its horizontally extending arm to the bottom of the top side wall of the channel 53 and through its vertically extending arm, which overlaps the inner face of the member 62, directly to said member by numerous spot welds (see Figs. 4, 8 and 16). The connecting angle 69 forms through its upper horizontal arm a shear panel for strongly tying the two parallel column structures together so that endwise thrust on one is transmitted through said panel to the other.

The auxiliary column 59 is also strongly connected both on its inner and outer faces to the double thickness metal formed by the secondary end sill 15 and the gusset 61 by inner and outer angles 70 and 71 welded, respectively, to the column structure and to the double thickness of metal 15, 61.

From this structure, it will be seen that the two main longitudinal columnar structures 47, 53, 55 and the secondary columnar structures 59, together with their strong connections to the end and secondary sills and their strong interconnection, form in effect a wide plate girder for taking collision shocks from the end sill outwardly of the said longitudinal columnar structures and transmitting them to the center sill proper and bolster. Some of these forces are also transmitted directly into the side frame through the end sill 14 and the secondary end sill 15. To this end, the end sill 14 is strongly connected to each of the front vertical posts 72 of the side wall structures by an angle 73 welded, respectively, to the bottom wall of the channel of the end sill and to the post 72. The connection is further strengthened by a channel 74 welded, respectively, through its sides to the top and bottom side walls of the end sill and to the post 72 (see Fig. 7). The base of this channel is disposed between the post 72 and angle 73 and the three overlapping sections of metal are all welded together.

Similarly, the secondary end sill 15 is strongly secured to the next vertical channel post 76 of the side frame. As is clearly shown in Figs. 4 and 8, this connection is made by a plate 77 welded to the outside of the bottom of the channel sill 15 and a pair of angles 78 and 79, the former welded to the inside of the bottom of the channel 15 and to the post, and the latter 79 welded to the top side wall of the channel 15 and the post. The connection to the post is strengthened and widened to obtain more area for welding by an angle 80 having one arm welded to the side wall of the post and the other arm overlapping the arms of the angles 78 and 79 and welded thereto.

As shown in Figs. 2, 3 and 4, the longitudinally deep vertical collision posts 81 are disposed on the outside face of the end sill directly in line with the auxiliary longitudinal columns 59 of the end underframe. These posts are composite sheet metal structures of box-cross section built up primarily of four parts with additional reinforcements where desirable. Between these posts and the end sill is arranged the end plating 82 and all those parts are secured together by spot welding, as clearly indicated in Fig. 4, so that any shock transmitted to the collision posts 81 is directly transmitted through the metal thickness of the end sill and end plating to the longitudinally extending columns of the end underframe. The posts 81 and the end sill and the end underframe structure extending between the end sill and the center sill are further interconnected by the buffer casting 83 which has a flat inner face overlapping the end sill between the posts 81 and strongly secured thereto by rivets extending through the end sill and the angles and channels connecting the longitudinal columnar structures 47, 53, 55 and 59 to the end sill (see Figs. 4 and 7). This casting extends beyond the vertical collision posts and has lateral extensions on its forward portion which overlap the outer faces of the posts and are securely riveted thereto.

By this construction, it is seen that any collision shocks delivered to the buffer casting or the end collision posts 81 are transmitted to substantially all of the longitudinally extending members of the underframe inwardly of the casting, and by reason of the strong connection of these members to each other and to the center sill proper in the manner already described, it will be seen that such collision shocks are well taken care of in this structure which is of extremely light weight as compared with such structures as heretofore utilized in transmitting such shocks to the center sill and bolster.

The vertically deepened outer ends of the main members 62 of the auxiliary longitudinal columns 59 provide means whereby collision shocks below the end sill may be transmitted into the underframe structure already described. To this end, referring now to Figs. 3, 5, 7 and 16, the collision posts 81 are also extended downwardly to substantially the depth of the forward portions of the members 62 and a substantial distance below the bottom of the end sill. In this region, however, the forward wall of the post is carried rearwardly to overlap the rear wall, as clearly shown in Fig. 16. The post section in this region comprises three thicknesses of metal spot welded together. The reason for this reduction in longitudinal section of the post in this region is to provide adequate room for the lateral swing of coupler head 84 which appears in dotted lines in Fig. 2.

The space between this reduced lower end of the post, designated generally by the numeral 85, and the vertical front margin 65 of the lower portion of member 62 is bridged by a coupler carrier casting 86 having a shoulder 87, Fig. 3, abutting the vertical face 65 of the member 62 and having a flange 87 which is riveted to the web of the member 62, as clearly appears in Figs. 3 and 16. The front portion of this casting is riveted through lateral flanges thereon, as clearly appears in Fig. 16, to the multiple metal thickness lower portion 85 of the post 81. From this construction, it will be seen that the collision forces striking the post below the center sill are transmitted directly through the casting 86 into the member 62 and through it, as above indicated, into the other longitudinal members of the underframe.

In Fig. 7, the relation of the coupler carrying bar 88 supported in the spaced castings 86 and the coupler stem 48 and the remaining parts of the underframe is clearly indicated. It will be seen that the stem has ample room for lateral swinging movement between the spaced castings 86 beneath the cut-away forward portions of the main longitudinal center sill extension members 47.

The downwardly projecting structures extending below the end sill 14 and including the connected casting 86 and lower collision post portion 85 are laterally braced to the end sill to distribute the shock, should the coupler stem 48 swing laterally far enough to strike these structures. Such bracing comprises a short wide channel member 75 having its top side wall overlapping and welded to the bottom side wall of the end sill 14. Its inner vertical wall abuts the casting 86 and overlaps the post extension 85 and is spot welded thereto; its outer margin is stiffened by spot welding it to a vertical flanged channel member 89 secured to the outer face of the end plate 82 and extending down to overlap the outer end of the bottom wall of the channel 75.

The end portions of the underframe, as clearly shown in Fig. 2, are further provided with transverse floor supporting angles 90 extending between the center sill end extension structure 13 and the side walls and secured, respectively, to these parts to support the flooring between the end sill 14 and the secondary end sill 15 and between the secondary end sill 15 and the bolster.

Between the bolsters, the transverse floor beams are secured directly to the center sill proper as shown in Figs. 6 and 18. The more important of these floor beams are channels 91 (see Fig. 18) of substantially C-section having deep vertical webs and having their upper sides substantially in the plane of the top of the bolster and their bottom sides resting upon the center sill 10. They are secured thereto on opposite sides thereof by vertical channels 92 having a wide sill wall overlapping the upper and lower flat faces of the lateral members 18 of the sill to which they are securely welded. The bottoms of these channels overlap the deep vertical web of the floor beam 91 and are spot welded thereto.

In regions where it is not so important that the side walls be strongly tied together and to the center sill as in regions adjacent the bolster (see Figs. 6 and 18), transverse floor beams of lighter construction may be employed. These may consist of channels 93 having a vertical wall of slight depth, the top walls of these channels being also arranged in the plane of the top walls of the vertically deep channel floor beams 91 but their bottom walls being spaced from the center sill. To securely attach these members to the center sill, the connection shown in Figs. 6 and 18 may be employed. This connection comprises vertical channels 92 secured to the center sill as before but in this case the upper ends of the members 92 are connected to the transverse member 93 through the intermediary of an angle 94 extending across the sill 10 and which is spot welded to the bottom wall of the channel 93 and to the top flanges of the sill members 18. These angles 94, in addition to furnishing a strong connection between the members 93 and the sill, also help to stabilize the sill by directly interconnecting the top side wall flanges thereof.

All of the transverse members 91 and 93 are, of course, strongly connected into the side frames by welding their end portions to the side wall posts and their connection to the side walls and center sill column stabilizes the center sill column and prevents it from buckling under extreme buffing loads. The entire underframe structure is further stabilized and strengthened by the closely spaced longitudinal stringers 95 which extend from end to end of the underframe adjacent the sides thereof and from the stepped end sill extensions 13 intermediate the lateral portions thereof (see Fig. 2).

These stringers are generally of Z-section having their webs extending vertically and are welded through one of their flanges to the top flanges of the bolster and the top side walls of the channel section floor beams. The upper horizontal flanges of these Z-members are in the same plane as the upper lateral flanges of the main longitudinal members 47, 53 and 62 of the center sill end extensions. Therefore, the two central Z-section stringers, as shown in Fig.

13, terminate at their forward ends in the region of the bolster and have their vertical walls overlap and secured to the vertical arms of the angles 52 extending rearwardly over the bolster from the main longitudinal members 47. The two Z-section stringers immediately outward of these central two are extended further forward over the transverse members 90 to the secondary end sill 15 and secured to these members, while the outer of these Z-section stringers are extended over all the cross members of the end underframe to the end sill and secured to all of the transverse members.

They are broken at the secondary end sill 15, as shown in Fig. 2, to permit the securement to this secondary end sill of a transversely wide vertically deep plate 96 (see Fig. 8) extending above the sill 15 to the plane of the top of the stringers and having a lateral flange at the top through which the plate is strongly welded to the floor plating 105, as shown in the section of Fig. 17. The purpose of these plates 96 is to transmit lateral forces directly from the secondary sills to the floor plating. Such forces are set up, for example, if a collision blow strikes the end buffer casting at one side only. The flooring is in this way brought into play to act as a shear panel in resisting the turning moments occasioned by such eccentric blows.

At each side, the underframe is strengthened and reinforced by vertically and transversely deep side sill structures. These structures are shown most clearly in the cross sections of Figs. 7 and 8. These side sills are double box-section structures and are preferably, for convenience of assembly, subassembled as parts of the side wall subassembly. The side wall subassembly is a truss structure including longitudinal chords, vertical posts and diagonals, and the side sill of the underframe in this case constitutes also the lower chord of the side wall truss.

These side sill structures each comprise a deep vertical plate 97 extending the length of the car and secured by welding to the inside wall of the vertical posts as 29, 72, 76 and an outside flanged channel 98 also running the full length of the body and secured to the outside walls of the posts. These two through-running members are connected to form a box section between the posts by an upper channel 99 and a lower angular member 100 which extends in beyond the posts and is secured to the bottom wall of a through-running longitudinal channel 101 which is welded to the plate 97. Thus the members 97, 98, 99, 100 and 101 form one of the box sections of which the double box-sectioned sill member is composed. The other box-section member is a wide transversely extending box section, many times wider than deep, and includes an upper through-running generally Z-sectioned member 102 and a lower through-running longitudinally ribbed member 103. The member 102 is secured through one of the arms of the Z to the plate 97, as by welding, and the other arm of the Z is extended horizontally and spot welded throughout to the inner margin of the plate 103. The outer margin of this plate overlies the top wall of the channel 101 and is spot welded thereto. The overlapped inner margins of the members 102 and 103 are substantially in the plane of the top of the channel of the end sill 14 and the top of the other floor supporting members, and to this overlapped portion is further welded a longitudinally extending through-running channel-section stringer 104. All of these parts can be readily assembled by spot welding in the subassembly of the side wall truss, and when the latter is brought in assembled relation with the underframe, this double box-section structure serves also as an underframe side sill having high resistance to collision shocks transmitted to it both longitudinally and transversely. In the final assembly, the lower side walls of the channels 101, 104 overlap the tops of the floor beams, and are welded thereto, and the vertical posts are secured to the ends of the floor beams.

The strong columnar side sill structures so described form a very important feature in the longitudinal collision-resisting structure of the underframe.

Finally, a floor plating 105, consisting of transversely corrugated strips extending from side sill to side sill and from end to end of the car and spot welded to each other and to the side and end sills, stringers and longitudinal column members of the end underframe construction, forms a strong shear panel to resist collision shocks and to distribute the shocks throughout the underframe. To make this flooring more efficient in this respect, it may be of increased gauge in the region of the end underframe structures. The central portion of the car may have lighter gauge floor sheeting since the stresses there are not so great. The floor sheeting not only forms a shear panel to take longitudinally directed shocks, but it also forms a strong shear panel in conjunction with the wide box-section structures of the side sills against laterally directed shocks. It is further stiffened transversely by channels 95' extending between the stringers 95 and welded to a bolster and the floor plating (see Figs. 2 and 6).

From the foregoing, it will be seen that the underframe described, while made substantially throughout of light-gauge sheet metal members rolled or drawn from strip stock and welded together substantially throughout so that the minimum of weight in the underframe is attained, is yet so constructed as to effectively absorb and distribute not only the heavy buffing shocks transmitted through the coupling but also the heavier collision shocks on the end structure as well as to resist heavy lateral shock against the side wall structure. The underframe so constructed, therefore, forms a strong protection against telescoping or crushing of the end and side walls of the car and this with very material saving in weight.

In the modification of the center sill end extensions shown in Figs. 21 to 24, inclusive, the parts which are similar to the parts shown in the preferred form are referred to by similar reference characters. This construction is primarily intended for use in car structures where a buffer mechanism is provided directly rearwardly of the end sill and between the main columnar members forming parts of the center sill end extension.

According to this construction, flanged channel section members 55' are substituted for the J-section members 55 in the preferred form, and these members are of substantially the same longitudinal extent as the J-section members. In their intermediate portions, these members are transversely connected by top and bottom plates 106 which overlap the top and bottom sides of the channels 55' and are secured thereto throughout by spot welding. For the greater portion of the length of the plates 106, they are reinforced from their outer end inwardly by two channels 107 and 108 which are welded back to back and to the plates through their side walls. The multiple box-section structure so produced, as clearly appears in Fig. 23, provides a wide, flat outer face against which the buffing mechanism can bear, and this structure provides a means for transmitting the buffing shocks directly to the main longitudinal column members formed by the elements 47, 53 and 55'. Outwardly of members 55', see Figs. 21 and 22, short channel guides 114 are provided.

In this modification, to further stiffen the main longitudinal column structures at opposite sides of the buffer housing, the top flanges of the main members 47 and 53 may be interconnected by ribbed plates 109 spot welded to these flanges. These ribbed plates extend inwardly from the end sill slightly beyond the forward face of the box-section abutment structure interconnecting the two main longitudinal column structures. The top flanges of the members 47 may be further interconnected by spaced plates 110 (see Figs. 21 and 22).

The structure performs very similarly to the preferred structure already described and is particularly desirable where heavy buffing loads are applied adjacent the top of the main longitudinal members.

In Figs. 19 and 20 are shown two modified forms of the center sill proper which may be used in place of the center sill proper described in the preferred form. The main difference between the center sills shown in Figs. 19 and 20 is in the form of the top and bottom members, the side members of the sill being of substantially the same form as the side members of the sill shown in the preferred form and referred to by the same reference numerals 17 and 18. The top and bottom members 111 in both these forms are not only overlapped with the side walls of the channels formed in the central portion of the side members 17, but they have edge flanges 112 which overlap the flat outer faces of the side members beyond the central channel and are preferably secured thereto also by welding. The form shown in Fig. 19, in addition, provides a flanged channel reinforcement 113 for the side members which is nested with the side members and secured thereto along the flat nested faces thereof by spot welding. The constructions shown in these modifications have substantially the same advantages as the preferred form, and may be used to advantage particularly where thinner gauges of metal give a sufficient area to take the buffing loads, as in smaller cars, for example.

Figs. 25, 26, 27 and 28 show an underframe generally similar to the underframe already described embodying another modified form of the center sill proper. Similar reference characters are used to designate similar parts. In this modification, the center sill proper 10a is designed to provide a generally channel cross-section as distinguished from the box cross-section shown in the preferred form.

By making the sill of this modified construction, less metal is used in its fabrication with consequent lighter weight. The modified form also provides greater accessibility for securing associated parts of the underframe to the sill.

By making the sill of channel cross-section, it can be readily fabricated of but three through-running longitudinal strips of sheet metal, these three strips being secured together to form the channel cross-section by but two lines of spot welds.

As shown in the drawings, each of the side members or strips 17 comprises, as in the preferred form, a deep outwardly facing channel 114 having flanges 115 extending from its side walls which are in turn formed with flanges 116, the flanges 115 and 116 providing angular attaching extensions for attaching other parts of the underframe, as will be described later on. The third member 19 preferably comprises an inwardly facing channel 116', as is the case with the top and bottom members of the preferred form, this channel having inclined side walls flanged at 117, these latter flanges having short marginal flanges 118.

In the assembly of the three members 17, 17, 19 into the sill structure, they are brought together with the flanges 117 overlapping the adjacent side walls of the channels 114 and through the two open joints so formed are connected together by two lines of spot welds indicated at 119. With this arrangement, the parts can be readily joined together, as in the preferred form, by simply moving the sill along the welding machine or the welding machine past the sill without removing the welding electrodes any appreciable distance from the work.

To stiffen the channel section of the sill, substantially equally spaced stiffeners 120 are preferably provided throughout the length of the sill, these stiffeners being preferably of channel cross-section having the bottom walls of the channels at their ends overlapping the adjacent side walls of the channels 114 of the side members 17 and spot welded thereto. The channels 120 are shallow, terminating a substantial distance below the inwardly extending flanges 116 so that access may be readily had to the inner side of the flanges 115, 116 along the whole length of the sill.

As shown in Fig. 25, the stiffening channels 120 may be arranged alternately to the transverse floor beams 91 and 93 and, since the latter are also securely welded to the opposite side walls of the channel of the sill, they contribute very materially to the stiffness and strength of the columnar sill structure.

The manner in which the transverse floor beams extending from side to side of the underframe are secured to the center sill is clearly shown in Figs. 26 and 27. The construction is similar to the preferred form, and the parts entering into it are designated by similar reference numerals.

As shown in Fig. 25, the ends of the center sill extend through the bolster 11 and are secured thereto in a manner not specifically shown, but which may correspond to that shown in the preferred form.

As shown in Fig. 28, the end sill extensions are secured to the ends of the sill 10a in the region of overlap in a manner similar to the preferred form, and the parts entering into this joint structure are designated by similar reference numerals.

In Fig. 27, the connection of the stringers 95 and transversely corrugated flooring 105 is shown to be similar to that of the preferred form.

The modified center sill construction shown in Figs. 25 to 28, inclusive, is thus seen to be even more readily joined to the remaining parts of the underframe than the preferred form because of the greater accessibility of certain of the attaching flanges thereof. It thus facilitates the manufacture of the underframe as a whole, and enables the overall weight of the car to be still further reduced over that shown in the preferred form.

This latter is an important consideration in modern, high-speed, light-weight rail car operations.

While several specific forms of underframe and center sill have been herein described, it will be understood that changes and modifications may be made by those skilled in the art without departing from the main features of the invention, and it is intended to cover these in the claims appended hereto.

What is claimed is:

1. In a rail car underframe, a rectangular box-section center sill fabricated of at least four rolled or drawn sheet metal strips, at least two of said strips being formed with a central outwardly presenting channel and edge flanges in the direction of said channel, the other two being formed with inwardly presenting channels and lateral flanges from the margins of said channels overlapping and secured to the side walls of the channels of the first-mentioned strips, the angular margins formed by the edge flanges of the first-mentioned strips providing flat faces accessible for attachment of other parts of the underframe to the sill.

2. In a rail car underframe, a box-section center sill according to claim 1 in which the last two strips have their channel portions reinforced by members nesting the same and secured thereto in the nested region.

3. In a rail car underframe, a box-section center sill according to claim 1 in which at least one of said pairs of strips is reinforced by a member nesting at least the central channel portion thereof and secured thereto in the nested region.

4. In a vehicle underframe, a center sill of hollow cross-section provided, on its external periphery, at the top with openly accessible single thickness metal flanges spaced apart and lying in a horizontal plane for support of and connection to floor beams continuous from side to side of the underframe and overlying the top of the sill, and at the sides with openly accessible single thickness metal flanges spaced apart and arranged in the same plane for support and attachment of generally upwardly extending members overlapping the sides of the sill and lying in planes intersecting said horizontal plane.

5. A vehicle underframe according to claim 4 in which the hollow cross-section is a box-section closed throughout the length of the sill.

6. A vehicle underframe according to claim 4 in which the hollow cross-section is of box form comprised of a plurality of through-running strips longitudinally welded together and the flanges are formed as extending edge projections of certain of said strips.

7. In a vehicle underframe, a center sill structure of hollow cross-section provided at the periphery of its cross-section throughout its length with two sets of freely accessible single thickness metal flanges for the support and connection, respectively, of floor beams and upwardly extending members secured to the sides of the sill structure, the flanges of each set being spaced apart and each set of flanges lying in a plane which is free of intersection by flanges of the other set and outwardly thereof, whereby interference of rectilinearly extending members supported by one set of flanges with the flanges of another set is avoided throughout the structure.

8. In a vehicle underframe, a center sill of box cross-section closed throughout the length of the sill and comprised of longitudinally through-running strip material welded together to form the box cross-section and disposed symmetrically about a vertical plane of symmetry, the box cross-section of the sill being of polygonal form and having on at least one of its sides, horizontally disposed freely projecting single thickness metal flanges spaced apart and arranged in the same plane for the support and connection of floor beams to the sill, while at least two other of its sides are provided with freely projecting single thickness metal flanges spaced apart and arranged in planes which intersect the plane of the horizontally disposed flanges on opposite sides of the plane of symmetry, said last-named flanges being suitable for the support and connection thereto of members which intersect said horizontal plane.

9. In a rail car underframe, a center sill of hollow cross-section fabricated of through-running metal strips extending lengthwise of the sill and comprising two generally parallelly extending spaced strips, each formed with a central outwardly presenting channel and having edge flanges extending in the direction of the channel, each edge flange forming, with the adjacent main body of its associated strip, an angular section marginal portion, and a connecting strip extending across the space between said spaced strips and overlapping the adjacent side walls of the channels of said spaced strips and secured thereto in the overlap, the angular section marginal portions of said spaced strips providing flat face attaching portions accessible from both sides for attachment of other parts of the underframe to the sill.

10. In a rail car underframe, a center sill of box cross-section fabricated of metal strips extending lengthwise of the sill and comprising a pair of generally parallelly extending spaced through-running strips, each formed with a central outwardly presenting channel and having edge flanges extending in the direction of said channel, each edge flange forming, with the adjacent main body of its associated strip, an angular section marginal portion, and a pair of through-running connecting strips extending across the space between said spaced strips and each said connecting strip overlapping two adjacent side walls of the channels of said spaced strips and secured thereto in the overlap, the angular section marginal portion of said spaced strips providing flat face attaching portions accessible from both sides for attachment of other parts of the underframe to the sill.

11. In a rail car underframe, a center sill of hollow cross-section fabricated of through-running metal strips extending lengthwise of the sill and comprising two generally parallelly extending spaced strips, each formed with a central outwardly presenting channel and having edge flanges extending in the direction of the channel, each edge flange forming, with the adjacent main body of its associated strip, an angular section marginal portion, and a connecting strip extending across the space between said spaced strips and formed with a central channel section portion and flange portions extending from the sides of the channel section portion and arranged in overlapping relation, respectively, with adjacent side walls of the channels of said spaced strips and secured thereto in the overlap, the angular section marginal portions of said spaced strips providing flat face attaching portions accessible from both sides for attachment of other parts of the underframe to the sill.

12. In a rail car underframe, a center sill of box cross-section fabricated of metal strips extending lengthwise of the sill and comprising a pair of generally parallelly extending spaced through-running strips, each formed with a centrally outwardly presenting channel and having edge flanges extending in the direction of the channel, each edge flange forming, with the adjacent main body of its associated strip, an angular section marginal portion, and a pair of connecting through-running strips extending across the space between the first pair of strips, each said connecting strip being formed with a central channel section portion and flange portions extending from the sides of said channel section portion, the flange portions of each connecting strip overlapping, and being secured in the overlap to, the adjacent side walls of the channels of the first pair of strips, the angular section marginal portions of said first pair of strips providing flat face attaching portions accessible from both sides for attachment of other parts of the underframe to the sill.

13. In a rail car underframe, a center sill of hollow cross-section fabricated of through-running metal strips extending lengthwise of the sill and comprising two generally parallelly extending spaced strips, each formed with a central outwardly presenting generally rectangular section channel and having edge flanges extending in the direction of the channel, each edge flange forming, with the adjacent main body of its associated strip, an angular section marginal portion, and a connecting strip having a central channel section portion with a flat bottom wall and inclined side walls, and flange portions extending from the side walls of said channel section portion, the flange portions being arranged in overlapping relation to the respective adjacent side walls of the channels of said spaced strips and secured thereto in the overlap, the angular section marginal portions of said spaced strips providing flat face attaching portions accessible from both sides for attachment of other parts of the underframe to the sill.

14. In a rail car underframe, a center sill of hollow cross-section fabricated of through-running metal strips extending lengthwise of the sill and comprising two generally parallelly extending strips spaced in their main bodies and each formed with a central outwardly presenting generally rectangular channel and having edge flanges extending in the direction of the channel and substantially parallel to its side walls, each edge flange forming, with the adjacent main body of its associated strip, an angular section marginal portion, the channel sides and flanges being substantially at right angles to the portions of the strips interconnecting said channel sides and flanges, and a connecting strip overlapping adjacent side walls of the channels of said parallelly extending strips and secured thereto in the overlap, the angular section marginal portions of said parallelly extending strips providing flat face attaching portions accessible from both sides for attachment of other parts of the underframe to the sill.

15. In a rail car underframe, a center sill of box cross-section fabricated of through-running metal strips extending lengthwise of the sill and comprising a pair of generally parallelly extending spaced strips, each formed with a central outwardly presenting channel and having edge flanges extending in the direction of the channel, and a pair of connecting strips extending across the space between the first pair of strips, each said connecting strip overlapping two adjacent side walls of the channels of said first pair of strips and secured thereto in the overlap, the overlapping portions of said connecting strips being flanged in their margins.

16. In a rail car underframe, a center sill of hollow cross-section fabricated of metal strips extending lengthwise of the sill and comprising two through-running generally parallelly extending spaced strips, each formed with a central outwardly presenting channel and having edge flanges extending in the direction of said channel, a through-running connecting strip extending across the space between said spaced strips and overlapping the adjacent side walls of the channels of said spaced strips and secured thereto in the overlap, and a pair of reinforcing strips, one associated with each of said spaced strips in overlapping relation with at least a portion thereof and secured thereto in the overlap.

17. In a rail car underframe, a center sill according to claim 10 in which at least one pair of strips is reinforced, each strip of said pair, by a longitudinally extending member over-lapping a portion at least of the cross-section of the strip and secured thereto in the overlap.

18. In a rail car underframe, a center sill according to claim 12 in which at least one pair of strips is reinforced, each strip of said pair, by a longitudinally extending member nesting at least the central channel section portion of the strip and secured thereto in the nested region.

19. In a rail car underframe, a center sill according to claim 12 in which at least one pair of strips is reinforced, each strip of said pair, by a strip member nesting at least the central channel section portion of the strip and secured thereto in the nested region, said reinforcing strips having edge flanges.

20. In a rail car underframe, a center sill of hollow cross-section fabricated of through-running metal strips extending lengthwise of the sill and comprising two generally parallelly extending strips whose main bodies are spaced apart and extend generally vertically and which strips are each formed in their main bodies with an outwardly presenting channel and have edge flanges extending in the direction of the channel and forming, with the adjacent main body portions, angular flat face attaching portions, and a connecting strip extending across the space between the main bodies of said parallelly extending strips and overlapping the adjacent side walls of the channels of said strips and secured thereto in the overlap, and floor beams extending across the top of the sill at spaced points longitudinally thereof and overlapping and secured to the top angular flat face attaching portions at the opposite sides of the sill.

21. In a rail car underframe, a center sill of hollow cross-section fabricated of through-running metal strips extending lengthwise of the sill and comprising two generally parallelly extending strips spaced in their main bodies which extend generally vertically and are each formed with an outwardly presenting channel and edge flanges extending in the direction of the channel, said edge flanges forming, with the adjacent main body portions, angular flat face attaching portions arranged above and below the channel, and a connecting strip extending across the space between the main bodies of said parallelly extending strips and overlapping adjacent side walls of the channels of said strips and secured thereto in the overlap, and floor beams extending across the top of the sill at spaced points longitudinally thereof and overlapping and secured to the top angular flat face attaching portions and, through downward extensions thereof on opposite sides of the sill, to the bottom such faces of the sill.

22. In a vehicle underframe, a center sill of generally channel cross-section provided, on its external periphery, at the top with openly accessible single thickness flanges lying in a horizontal plane for support of and connection to transverse floor beams overlying the top of the sill, and at the sides with openly accessible single thickness spaced flanges for support of and connection to generally upwardly extending members overlapping the sides of the sill and lying in planes intersecting said horizontal plane.

23. In a vehicle underframe according to claim 22 in which the channel of the sill faces vertically and the side walls of the channel are interconnected at spaced intervals only along the length of the sill.

24. In a vehicle underframe according to claim 22 in which the channel cross-section of the sill is comprised of through-running strips welded along longitudinal lines and the flanges are formed as extending edge projections of certain of the strips.

25. In a vehicle underframe, a center sill of channel cross-section, formed by three through-running longitudinal strips welded together by two longitudinal lines of welds, two of the strips forming the side walls of the channel cross-section and being formed with openly accessible single thickness spaced edge flanges extending transversely and vertically for overlapping engagement with and securement to transverse and vertically disposed members associated with the sill in the underframe.

26. In a vehicle underframe, a center sill of channel cross-section, formed by three through-running longitudinal strips welded together by two longitudinal lines of welds, two of the strips forming the side walls of the channel cross-section being of channel cross-section presenting outwardly, side channels having angular section attaching extensions from each side wall, and the third strip being of inwardly presenting channel cross-section having edge flanges from the side walls of its channel cross-section overlapping the adjacent channel side walls of said two first-named strips and secured thereto by said lines of welds.

27. In a vehicle underframe according to claim 26 in which the other two side walls of the channels of the said two first-named strips are secured together at spaced intervals only by angular section transverse members.

28. In a vehicle underframe according to claim 22 in which the channel of the center sill faces upwardly and the horizontal flanges of the side walls of the channel are interconnected at spaced intervals by the transverse floor beams extending across the top of the sill.

29. In a vehicle underframe according to claim 22 in which the channel of the center sill faces upwardly and the side walls of the channel are interconnected alternately at spaced intervals only by short braces extending therebetween and floor beams extending across the top of the sill from side to side of the underframe.

ALBERT G. DEAN.